United States Patent
Zheng et al.

(10) Patent No.: US 9,350,612 B2
(45) Date of Patent: May 24, 2016

(54) METHOD, NETWORK DEVICE, AND SYSTEM FOR SYNCHRONIZATION BETWEEN NETWORK DEVICES

(71) Applicant: Huawei Technologies Co., Ltd., Shenzhen (CN)

(72) Inventors: Lianshu Zheng, Beijing (CN); Guoyi Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 62 days.

(21) Appl. No.: 14/297,830

(22) Filed: Jun. 6, 2014

(65) Prior Publication Data

US 2014/0301183 A1  Oct. 9, 2014

Related U.S. Application Data

(63) Continuation of application No. PCT/CN2012/085441, filed on Nov. 28, 2012.

(30) Foreign Application Priority Data

Dec. 7, 2011  (CN) .......................... 2011 1 0403134

(51) Int. Cl.
*H04L 12/24* (2006.01)
*H04L 29/08* (2006.01)
(Continued)

(52) U.S. Cl.
CPC ........ *H04L 41/0846* (2013.01); *H04L 41/0672* (2013.01); *H04L 41/0893* (2013.01); *H04L 45/021* (2013.01); *H04L 45/50* (2013.01);
(Continued)

(58) Field of Classification Search
None
See application file for complete search history.

(56) References Cited

U.S. PATENT DOCUMENTS

2005/0063395 A1  3/2005  Smith et al.
2005/0152286 A1  7/2005  Betts et al.
(Continued)

FOREIGN PATENT DOCUMENTS

CN  1848747 A  10/2006
CN  2912119 Y  6/2007
(Continued)

OTHER PUBLICATIONS

Martini, L. et al., "Inter-Chassis Communication Protocol for L2VPN PE Redundancy," Internet Engineering Task Force Internet Draft, Standards Track, Jul. 9, 2011, 78 pages.
(Continued)

*Primary Examiner* — Donald Mills
(74) *Attorney, Agent, or Firm* — Slater Matsil, LLP (57) ABSTRACT

A method, a network device, and a system for synchronization between network devices are provided. The method includes: establishing, by a first network device, an inband synchronization channel to a second network device in a MPLS-TP network, where the inband synchronization channel is a channel on a data plane, and the first network device and the second network device are included in a same backup group; sending, a first synchronization packet to the second network device through the inband synchronization channel, where the first synchronization packet carries synchronization information of the first network device, and the synchronization information of the first network device includes configuration information or status information of the first network device. The present disclosure can implement synchronization between network devices on an MPLS-TP network that does not have a control plane.

14 Claims, 7 Drawing Sheets

(51) Int. Cl.
*H04L 12/755* (2013.01)
*H04L 12/723* (2013.01)
*H04L 12/775* (2013.01)
*H04L 12/773* (2013.01)

(52) U.S. Cl.
CPC ............ *H04L67/1095* (2013.01); *H04L 45/58* (2013.01); *H04L 45/60* (2013.01)

(56) References Cited

U.S. PATENT DOCUMENTS

| | | | | |
|---|---|---|---|---|
| 2010/0238791 | A1* | 9/2010 | Duncan | H04L 43/0811 370/216 |
| 2011/0200051 | A1* | 8/2011 | Rivaud | H04J 3/0641 370/400 |
| 2011/0286324 | A1* | 11/2011 | Bellagamba | H04L 41/0677 370/219 |
| 2012/0057453 | A1 | 3/2012 | Xie | |
| 2012/0155283 | A1* | 6/2012 | Sanguineti | H04L 45/00 370/241.1 |
| 2012/0176911 | A1* | 7/2012 | Pan | H04L 43/10 370/241.1 |
| 2012/0219003 | A1 | 8/2012 | Cui et al. | |
| 2013/0044028 | A1* | 2/2013 | Lea | H01Q 21/24 342/359 |

FOREIGN PATENT DOCUMENTS

| | | |
|---|---|---|
| CN | 101360056 A | 2/2009 |
| CN | 101577719 A | 11/2009 |
| CN | 102136936A A | 7/2011 |
| WO | 2011009494 A1 | 1/2011 |
| WO | 2011055837 A1 | 5/2011 |

OTHER PUBLICATIONS

Bocci et al., "MPLS Generic Associated Channel," Memo, Network Working Group, Jun. 2009, 19 pages.

Nadeau et al., "Inter-Chassis Communication Protocol for L2VPN PE Redundancy," Memo, Internet Engineering Task Force, draft-ietf-pwe3-iccp-05.txt, Apr. 25, 2011, 67 pages.

International Search Report received in PCT/CN2012/0854411, mailed Feb. 28, 2013, 14 pages.

* cited by examiner

METHOD, NETWORK DEVICE, AND SYSTEM FOR SYNCHRONIZATION BETWEEN NETWORK DEVICES

CROSS-REFERENCE TO RELATED APPLICATIONS

This application is a continuation of International Application No. PCT/CN2012/085441, filed on Nov. 28, 2012, which claims priority to Chinese Patent Application No. 201110403134.4, filed on Dec. 7, 2011, both of which are hereby incorporated by reference in their entireties.

TECHNICAL FIELD

The present disclosure relates to the communication field, and in particular, to a method, a network device, and a system for synchronization between network devices.

BACKGROUND

In a communications network, network availability is one of key indicators of the communications network that an operator focuses on. In the communications network, redundancy backup between network devices is an important means used by the operator to improve the network availability. The operator can perform synchronization between the network devices to implement the redundancy backup between the network devices.

Currently, the Inter-Chassis Communication Protocol (ICCP) may be used to perform synchronization between the network devices. It should be noted that the ICCP is a protocol belonging to a control plane and therefore can be used only on a network that has a control plane.

In a process of implementing the present disclosure, the inventor finds that at least the following problem exists in the prior art:

A Multiprotocol Label Switching Transport Profile (MPLS-TP) network includes an MPLS-TP network that has a control plane and an MPLS-TP network that does not have a control plane. The ICCP cannot be used in the MPLS-TP network that does not have the control plane, so that the synchronization between the network devices cannot be performed in the MPLS-TP network that does not have the control plane.

SUMMARY

Embodiments of the present disclosure provide a method, a network device, and a system for synchronization between network devices so as to implement the synchronization between the network devices in an MPLS-TP network that does not have a control plane.

According to one aspect, an embodiment of the present disclosure provides a method for synchronization between network devices. The method includes:

establishing, by a first network device, an inband synchronization channel to a second network device in an MPLS-TP network, where the inband synchronization channel is a channel on a data plane, and the first network device and the second network device are included in a same backup group; and sending, by the first network device, a first synchronization packet to the second network device through the inband synchronization channel, where the first synchronization packet carries synchronization information of the first network device so that the second network device performs synchronization processing according to the synchronization information of the first network device, and the synchronization information of the first network device includes configuration information and/or status information of the first network device.

According to one aspect, an embodiment of the present disclosure provides a method for synchronization between network devices. The method includes:

establishing, by a second network device, an inband synchronization channel to a first network device in an MPLS-TP network, where the inband synchronization channel is a channel on a data plane, and the first network device and the second network device are included in a same backup group;

receiving, by the second network device through the inband synchronization channel, a first synchronization packet sent by the first network device, where the first synchronization packet carries synchronization information of the first network device, and the synchronization information of the first network device includes configuration information and/or status information of the first network device; and performing, by the second network device, synchronization processing according to the synchronization information of the first network device, so as to implement synchronization with the first network device.

According to one aspect, an embodiment of the present disclosure provides a first network device. The first network device includes:

a first establishing module, configured to establish, an inband synchronization channel to a second network device in an MPLS-TP network, where the inband synchronization channel is a channel on a data plane, and the first network device and the second network device are included in a same backup group; and a first sending module, configured to send a first synchronization packet to the second network device through the inband synchronization channel, where the first synchronization packet carries synchronization information of the first network device so that the second network device performs synchronization processing according to the synchronization information of the first network device, and the synchronization information of the first network device includes at least configuration information and/or status information of the first network device.

According to one aspect, an embodiment of the present disclosure provides a second network device. The second network device includes:

a second establishing module, configured to establish, an inband synchronization channel to a first network device in an MPLS-TP network, where the inband synchronization channel is a channel on a data plane, and the first network device and the second network device are included in a same backup group;

a second receiving module, configured to receive, through the inband synchronization channel, a first synchronization packet sent by the first network device, where the first synchronization packet carries synchronization information of the first network device, and the synchronization information of the first network device comprises configuration information and/or status information of the first network device; and a second synchronizing module, configured to perform synchronization processing according to the synchronization information of the first network device, so as to implement synchronization with the first network device.

According to one aspect, an embodiment of the present disclosure provides a system for synchronization between network devices. The system includes the first network device and the second network device.

In one embodiment of the present disclosure, a first network device establishes an inband synchronization channel to a second network device in an MPLS-TP network and sends a first synchronization packet to the second network device through the established inband synchronization channel, where the first synchronization packet carries synchronization information of the first network device so that the second network device performs synchronization processing according to the synchronization information of the first network device to implement synchronization with the first network device, thereby implementing synchronization between the network devices in the MPLS-TP network that does not have a control plane.

DESCRIPTION OF EMBODIMENTS

To make the objectives, technical solutions, and advantages of the present disclosure clearer, the following further describes the embodiments of the present disclosure in detail with reference to the accompanying drawings.

Embodiment 1

Figure 1:
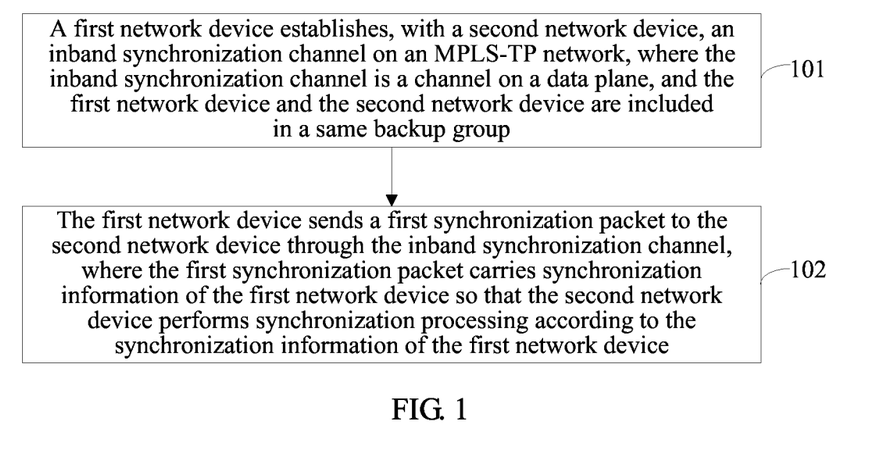
FIG. 1 is a flowchart of a method for synchronization between network devices according to Embodiment 1 of the present disclosure.

As shown in FIG. 1, this embodiment of the present disclosure provides a method for synchronization between network devices, including:

Step 101: A first network device establishes an inband synchronization channel to a second network device in an MPLS-TP network, where the inband synchronization channel is a channel on a data plane, and the first network device and the second network device are included in a same backup group.

Step 102: The first network device sends a first synchronization packet to the second network device through the inband synchronization channel, where the first synchronization packet carries synchronization information of the first network device so that the second network device performs synchronization processing according to the synchronization information of the first network device, and the synchronization information of the first network device includes at least configuration information and/or status information of the first network device.

Optionally, the established inband synchronization channel may be a generic associated channel (G-ACH).

In some embodiments, the first synchronization packet includes a generic associated channel header, where the generic associated channel header includes a channel type field, the channel type field carries synchronization packet identification information, the synchronization packet identification information is used to identify a packet that carries the synchronization packet identification information as a synchronization packet, and the synchronization packet identification information can be identified by the second network device.

In some embodiments, after the establishing the inband synchronization channel to the second network device in the MPLS-TP network by the first network device, the method further includes:

receiving, by the first network device through the inband synchronization channel, a second synchronization packet sent by the second network device, where the second synchronization packet carries synchronization information of the second network device, and the second synchronization packet includes the generic associated channel header; and performing, by the first network device, synchronization processing on the first network device according to the synchronization information of the second network device, so as to make the first network device synchronous with the second network device.

In some embodiments, after the sending the first synchronization packet to the second network device through the inband synchronization channel, the method further includes:

after the synchronization information of the first network device changes, sending, by the first network device, a third synchronization packet to the second network device through the inband synchronization channel, where the third synchronization packet includes new synchronization information of the first network device and the generic associated channel header so that the second network device synchronizes with the first network device according to the new synchronization information of the first network device.

In some embodiments, after the establishing the inband synchronization channel to the second network device in the MPLS-TP network by the first network device, the method further includes:

receiving, by the first network device, a synchronization request message sent by the second network device;

determining, by the first network device, according to the synchronization request information, synchronization information that is requested by the second network device; and sending, by the first network device, a fourth synchronization packet to the second network device through the inband synchronization channel, where the fourth synchronization packet carries the synchronization information that is requested by the second network device and the generic associated channel header so that the second network device synchronizes with the first network device according to the synchronization information that is requested by the second network device.

Optionally, the synchronization request message is used to request, for the second network device, all synchronization information of the first network device when the synchronization request message is received; or, the synchronization request message is used to request, for the second network device, part of synchronization information of the first network device when the synchronization request message is received, where the part of synchronization information belongs to a same information type.

In this embodiment of the present disclosure, a first network device establishes an inband synchronization channel to a second network device in an MPLS-TP network and sends a first synchronization packet to the second network device through the established inband synchronization channel, where the first synchronization packet carries synchronization information of the first network device so that the second network device performs synchronization processing according to the synchronization information of the first network device to implement synchronization between the network devices in the MPLS-TP network that does not have a control plane.

Embodiment 2

Figure 2:
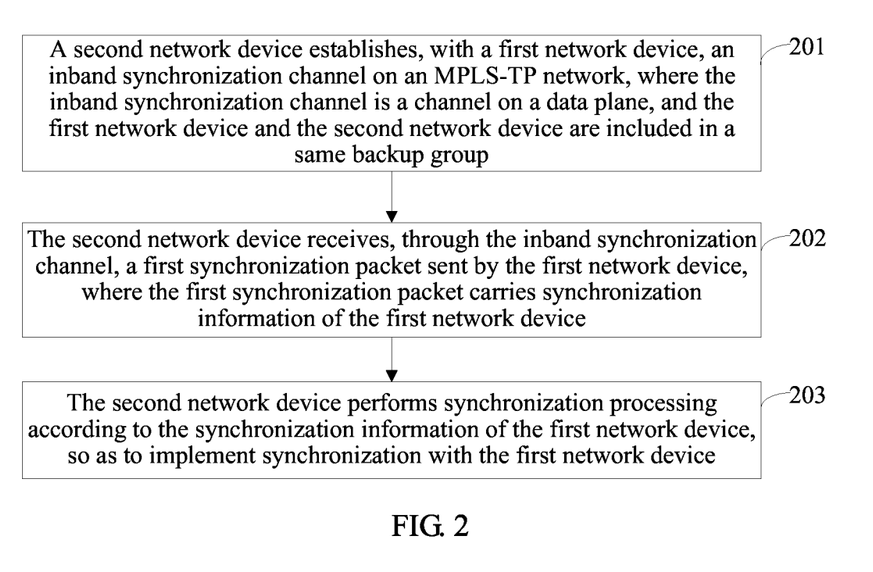
FIG. 2 is a flowchart of a method for synchronization between network devices according to Embodiment 2 of the present disclosure.

As shown in FIG. 2, this embodiment of the present disclosure provides a method for synchronization between network devices, including:

Step 201: A second network device establishes an inband synchronization channel to a first network device in an MPLS-TP network, where the inband synchronization channel is a channel on a data plane, and the first network device and the second network device are included in a same backup group.

Step 202: The second network device receives, through the inband synchronization channel, a first synchronization packet sent by the first network device, where the first synchronization packet carries synchronization information of the first network device.

The synchronization information of the first network device includes configuration information and/or status information of the first network device.

Step 203: The second network device performs synchronization processing according to the synchronization information of the first network device, so as to implement synchronization with the first network device.

Optionally, the established inband synchronization channel may be a G-ACH channel.

Optionally, the first synchronization packet includes a generic associated channel header, where the generic associated channel header includes a channel type field, the channel type field carries synchronization packet identification information, the synchronization packet identification information is used to identify a packet that carries the synchronization packet identification information as a synchronization packet, and the synchronization packet identification information can be identified by the second network device.

In some embodiments, after the establishing the inband synchronization channel to the first network device in the MPLS-TP network by the second network device, the method further includes:

sending, by the second network device, a second synchronization packet to the first network device through the inband synchronization channel, where the second synchronization packet includes synchronization information of the second network device and the generic associated channel header so that the first network device performs synchronization processing according to the synchronization information of the second network device.

In some embodiments, after the performing synchronization processing according to the synchronization information of the first network device, the method further includes:

after the synchronization information of the first network device changes, receiving, by the second network device through the inband synchronization channel, a third synchronization packet sent by the first network device, where the third synchronization packet includes new synchronization information of the first network device and the generic associated channel header; and synchronizing, by the second network device, with the first network device according to the new synchronization information of the first network device.

Optionally, the synchronization request message is used to request, for the second network device, all synchronization information of the first network device when the synchronization request message is received; or, the synchronization request message is used to request, for the second network device, part of synchronization information of the first network device when the synchronization request message is received, where the part of synchronization information belongs to a same information type.

In this embodiment of the present disclosure, a second network device establishes an inband synchronization channel to a first network device in an MPLS-TP network; receives, through the established inband synchronization channel, a first synchronization packet sent by the first network device, where the first synchronization packet carries synchronization information of the first network device; and performs synchronization processing according to the synchronization information of the first network device, so as to implement synchronization with the first network device, thereby implementing synchronization between the network devices in the MPLS-TP network that does not have a control plane.

Embodiment 3

Figure 3:
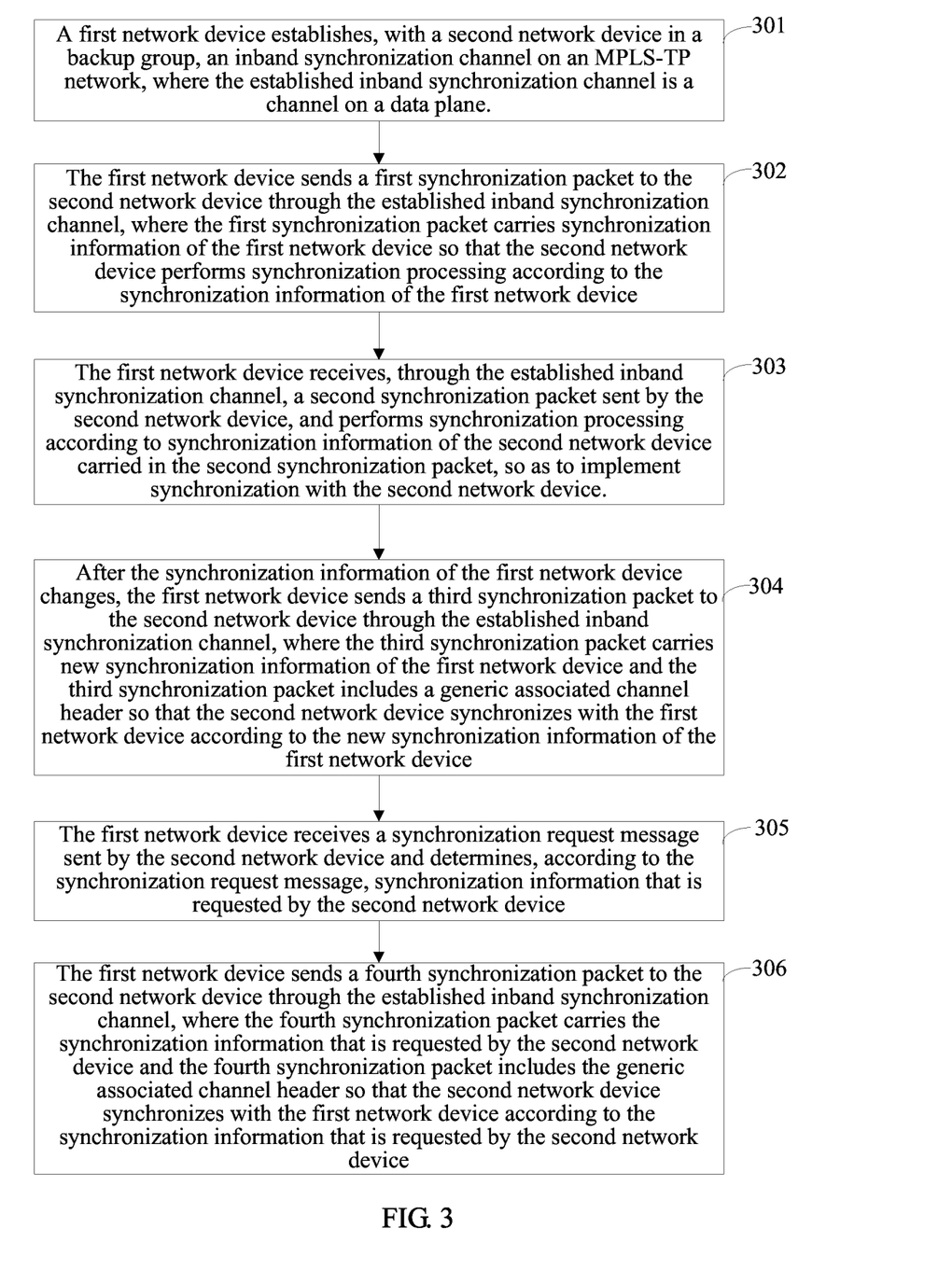
FIG. 3 is a flowchart of a method for synchronization between network devices according to Embodiment 3 of the present disclosure.

This embodiment of the present disclosure provides a method for synchronization between network devices, where a first network device and a second network device are included in a same backup group, and the first network device may use the method in this embodiment to synchronize with the second network device. Referring to FIG. 3, the method includes the following content:

Step 301: The first network device establishes an inband synchronization channel to the second network device in the backup group in an MPLS-TP network, where the established inband synchronization channel is a channel on a data plane.

In some embodiments, the established inband synchronization channel may be a G-ACH channel.

In some embodiments, multiple network devices in the MPLS-TP network may be grouped into one backup group in advance, the first network device is any one network device in the backup group, and the second network device is one or more network devices in the backup group except the first network device; in addition, when the first network device starts, the first network device synchronizes with the second network device in the backup group.

In some embodiments, synchronization information of the first network device includes configuration information and/or status information; the configuration information includes pseudo wire (PW) configuration information, label switch path (LSP) configuration information, and/or section (Section) configuration information; the status information includes PW status information, LSP status information, and/or Section status information.

Step 302: The first network device sends a first synchronization packet to the second network device through the established inband synchronization channel, where the first synchronization packet carries the synchronization information of the first network device so that the second network device performs synchronization processing according to the synchronization information of the first network device.

In some embodiments, the first synchronization packet includes a generic associated channel header, where the generic associated channel header includes a channel type field, the channel type field carries synchronization packet identification information, the synchronization packet identification information is used to identify a packet that carries the synchronization packet identification information as a synchronization packet, and the synchronization packet identification information can be identified by the second network device.

In some embodiments, the second network device receives, through the established inband synchronization channel, the first synchronization packet sent by the first network device, and performs synchronization processing according to the synchronization information of the first network device, so as to implement synchronization with the first network device. It should be noted that the second network device identifies the first synchronization packet as a synchronization packet according to the synchronization packet identification information in the generic associated channel header included in the first synchronization packet, and stores the synchronization information of the first network device carried in the first synchronization packet, so as to implement synchronization with the first network device.

In this embodiment, after the first network device establishes the inband synchronization channel with the second network, the second network device may also sends synchronization information included by the second network device itself to the first network device so that the first network synchronize with the second network device, which is specifically as follows: The second network device sends a second synchronization packet to the first network device through the established inband synchronization channel, where the second synchronization packet carries synchronization information of the second network device, and the second synchronization packet includes the generic associated channel header.

This embodiment may further include step 303.

Step 303: The first network device receives, through the established inband synchronization channel, the second synchronization packet sent by the second network device, and performs synchronization processing according to the synchronization information of the second network device carried in the second synchronization packet, so as to implement synchronization with the second network device.

In some embodiments, the first network device receives, through the established inband synchronization channel, the second synchronization packet sent by the second network device, identifies the second synchronization packet as a synchronization packet according to the synchronization packet identification information in the generic associated channel header included in the second synchronization packet, and stores the synchronization information of the second network device carried in the second synchronization packet, so as to implement synchronization with the second network device.

In this embodiment, the MPLS-TP network may be an MPLS-TP network that has a control plane, or may also be an MPLS-TP network that does not have a control plane, and the inband synchronization channel is established between the first network device and the second network device. The first network device sends the synchronization information included by the first network device itself to the second network device in the backup group through the established inband synchronization channel, and the second network device receives the synchronization information of the first network device through the established inband synchronization channel and synchronizes with the first network device according to the synchronization information of the first network device. In some embodiments, the second network device may send the synchronization information included by the second network device itself to the first network device in the backup group through the established inband synchronization channel, and the first network device receives the synchronization information of the second network device through the established inband synchronization channel and synchronizes with the second network device according to the synchronization information of the second network device; the first network device is any one network device in the backup group, and the second network device is a network device in the backup group except the first network device. Therefore, synchronization between the network devices can be implemented in the MPLS-TP network that does not have a control plane.

In this embodiment, if a certain piece of the synchronization information of the first network device changes and new synchronization information is generated, the following step 304 may be used to make the second network device perform synchronization processing, so as to implement synchronization between the first network device and the second network device. Step 304 may be performed in a situation in which step 303 has been performed, or may also be performed in a situation in which step 303 is not performed. For example, after step 302 is performed, step 303 is not performed but step 304 is performed.

Step 304: After the synchronization information of the first network device changes, the first network device sends a third synchronization packet to the second network device through the established inband synchronization channel, where the third synchronization packet carries new synchronization information of the first network device and the third synchronization packet includes the generic associated channel header so that the second network device synchronizes with the first network device according to the new synchronization information of the first network device.

The second network device receives the third synchronization packet through the established inband synchronization channel and synchronizes with the first network device according to the new synchronization information of the first network device carried in the third synchronization packet. It should be noted that the second network device identifies the third synchronization packet as a synchronization packet according to the synchronization packet identification information in the generic associated channel header included in the third synchronization packet, determines an information type of the new synchronization information of the first network device carried in the third synchronization packet, and updates the stored synchronization information corresponding to the information type to the new synchronization information of the first network device, so as to implement synchronization with the first network device.

In some embodiments, the synchronization information includes configuration information and/or status information; the configuration information further specifically includes PW configuration information, LSP configuration information, and/or Section configuration information; the status information further specifically includes PW status information, LSP status information, and/or Section status information.

In this embodiment, the second network device may send a synchronization request message to the first network device, so as to request, from the first network device, synchronization information that needs to be synchronized. If the second network device requests all synchronization information included by the first network device, the synchronization request message sent by the second network device to the first network device may not carry an information type of the synchronization information that is requested; if the second network device requests only part of synchronization information of the first network device, the synchronization request message sent by the second network device to the first network device may further carry an information type of the synchronization information that is requested by the second network device, so that the first network device sends only synchronization information that belongs to the information type to the second network device.

Step 305: The first network device receives the synchronization request message sent by the second network device and determines, according to the synchronization request message, the synchronization information that is requested by the second network device.

Specifically, the first network device receives the synchronization request message sent by the second network device. If the synchronization request message does not carry the information type of the synchronization information that is requested by the second network device, the first network device determines that the second network device requests all synchronization information included by the first network device; if the synchronization request message further carries the information type of the synchronization information that is requested by the second network device, the first network device determines that the synchronization information that is requested by the second network device is synchronization information corresponding to the information type.

Step 306: The first network device sends a fourth synchronization packet to the second network device through the established inband synchronization channel, where the fourth synchronization packet carries the synchronization information that is requested by the second network device and the fourth synchronization packet includes the generic associated channel header so that the second network device synchronizes with the first network device according to the synchronization information that is requested by the second network device.

The second network device receives the fourth synchronization packet through the established inband synchronization channel and performs synchronization processing according to the synchronization information that is requested by the second network device and carried in the fourth synchronization packet, so as to implement synchronization with the first network device. It should be noted that the second network device identifies the fourth synchronization packet as a synchronization packet according to the synchronization packet identification information in the generic associated channel header included in the fourth synchronization packet and updates the stored synchronization information that is requested by the second network device to the synchronization information that is requested by the second network device and carried in the fourth synchronization packet, so as to implement synchronization with the first network device.

It should be further noted that, in some embodiments, step 306 is performed after step 305 is performed. That is, step 305 is a basis of step 306 in some embodiments. However, step 305 may not depend on step 303 or may also not depend on step 304. That is, step 305 may be performed in a situation in which step 303 and/or step 304 is not performed.

In this embodiment of the present disclosure, a first network device establishes an inband synchronization channel to a second network device in a backup group in an MPLS-TP network and sends a first synchronization packet to the second network device through the established inband synchronization channel, where the first synchronization packet carries synchronization information of the first network device; the second network device receives the first synchronization packet through the established inband synchronization channel and synchronizes with the first network device according to the synchronization information of the first network device carried in the first synchronization packet; the second network device sends a second synchronization packet to the first network device through the established inband synchronization channel, where the second synchronization packet carries synchronization information of the second network device; and the first network device receives the second synchronization packet through the established inband synchronization channel and synchronizes with the second network device according to the synchronization information of the second network device carried in the second synchronization packet. The foregoing processing implements synchronization between the network devices in the MPLS-TP network that does not have a control plane.

Embodiment 4

Figure 4:
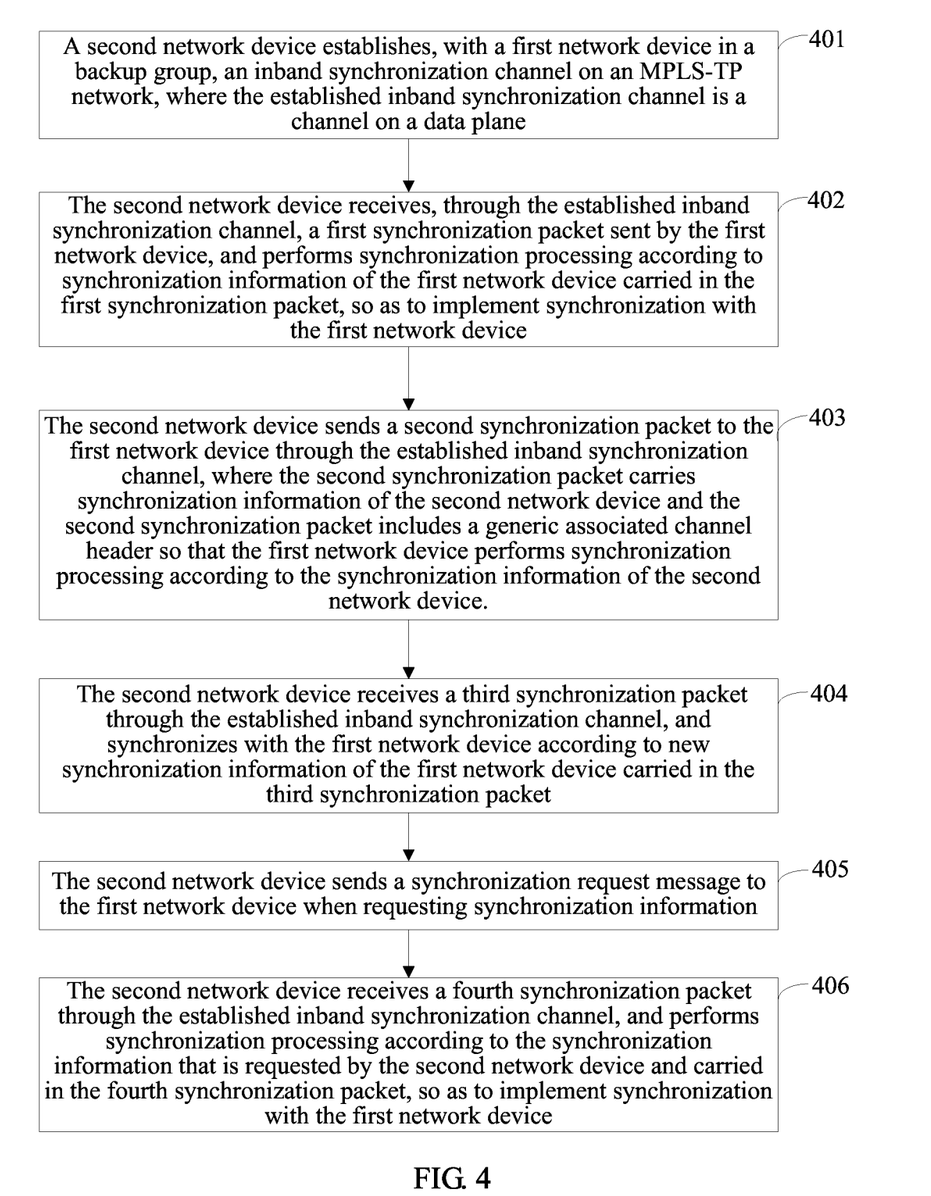
FIG. 4 is a flowchart of a method for synchronization between network devices according to Embodiment 4 of the present disclosure.

This embodiment of the present disclosure provides a method for synchronization between network devices, where a first network device and a second network device are included in a same backup group, and the second network device may use the method in this embodiment to synchronize with the first network device. Referring to FIG. 4, the method includes the following content:

Step 401: The second network device establishes an inband synchronization channel to the first network device in the backup group in an MPLS-TP network, where the established inband synchronization channel is a channel on a data plane.

In some embodiments, the established inband synchronization channel may be a G-ACH channel.

In some embodiments, multiple network devices in the MPLS-TP network may be grouped into one backup group in advance, the first network device is any one network device in the backup group, and the second network device is any one or multiple network devices in the backup group except the first network device.

It should be noted that, in some embodiments, the first network device synchronizes with the second network device after the first network device starts, and the first network device may send a first synchronization packet to the second network device through the established inband synchronization channel, where the first synchronization packet carries synchronization information of the first network device, and the first synchronization packet includes a generic associated channel header.

In some embodiments, the synchronization information of the first network device includes configuration information and/or status information; the configuration information includes PW configuration information, LSP configuration information, and/or Section configuration information; the status information includes PW status information, LSP status information, and/or Section status information. The generic associated channel header included in the first synchronization packet includes a channel type field, the channel type field carries synchronization packet identification information, the synchronization packet identification information is used to identify a packet that carries the synchronization packet identification information as a synchronization packet, and the synchronization packet identification information can be identified by the second network device.

Step 402: The second network device receives, through the established inband synchronization channel, the first synchronization packet sent by the first network device, and performs synchronization processing according to the synchronization information of the first network device carried in the first synchronization packet, so as to implement synchronization with the first network device.

In some embodiments, the second network device receives, through the established inband synchronization channel, the first synchronization packet sent by the first network device, identifies the first synchronization packet as a synchronization packet according to the synchronization packet identification information in the generic associated channel header included in the first synchronization packet, and stores the synchronization information of the first network device carried in the first synchronization packet, so as to implement synchronization with the first network device.

In this embodiment, after the second network device establishes the inband synchronization channel with the first network device, the second network device may perform step 403 to send synchronization information included by the second network device itself to the first network device so that the first network device synchronizes with the second network device.

Step 403: The second network device sends a second synchronization packet to the first network device through the established inband synchronization channel, where the second synchronization packet carries the synchronization information of the second network device and the second synchronization packet includes the generic associated channel header so that the first network device performs synchronization processing according to the synchronization information of the second network device.

Because the inband synchronization channel between the first network device and the second network device has been established, in step 403, the second network device may send the second synchronization packet to the first network device directly through the established inband synchronization channel.

The first network device receives, through the established inband synchronization channel, the second synchronization packet sent by the second network device, and performs synchronization processing according to the synchronization information of the second network device carried in the second synchronization packet, so as to implement synchronization with the second network device. It should be noted that the first network device identifies the second synchronization packet as a synchronization packet according to the synchronization packet identification information in the generic associated channel header included in the second synchronization packet, and stores the synchronization information of the second network device carried in the second synchronization packet, so as to implement synchronization with the second network device.

In this embodiment, the MPLS-TP network may be an MPLS-TP network that has a control plane, or may also be an MPLS-TP network that does not have a control plane, and the inband synchronization channel is established between the first network device and the second network device. The second network device receives the synchronization information of the first network device through the established inband synchronization channel and synchronizes with the first network device according to the synchronization information of the first network device; the second network device sends the synchronization information included by the second network device itself to the first network device in the backup group through the established inband synchronization channel, so that the first network device synchronizes with the second network device according to the synchronization information of the second network device; the first network device is any one network device in the backup group, and the second network device is a network device in the backup group except the first network device. Therefore, synchronization between the network devices can be implemented on the MPLS-TP network that does not have a control plane.

In this embodiment, if a certain piece of the synchronization information of the first network device changes and new synchronization information is generated, the first network device sends a third synchronization packet to the second network device through the established inband synchronization channel, where the third synchronization packet carries the new synchronization information of the first network device, and the third synchronization packet includes the generic associated channel header.

This embodiment may further include step 404. Step 404 may be performed in a situation in which step 403 has been performed, or may also be performed in a situation in which step 403 is not performed. For example, after step 402 is performed, step 403 is not performed but step 404 is performed.

Step 404: The second network device receives the third synchronization packet through the established inband synchronization channel, and synchronizes with the first network device according to the new synchronization information of the first network device carried in the third synchronization packet.

In some embodiments, the second network device receives the third synchronization packet through the established inband synchronization channel, identifies the third synchronization packet as a synchronization packet according to the synchronization packet identification information in the generic associated channel header included in the third synchronization packet, determines an information type of the new synchronization information of the first network device carried in the third synchronization packet, and updates the stored synchronization information corresponding to the information type to the new synchronization information of the first network device, so as to implement synchronization with the first network device.

In some embodiments, a type of the synchronization information includes configuration information and/or status information; a type of the configuration information further specifically includes PW configuration information, LSP configuration information, and/or Section configuration information, and a type of the status information further specifically includes PW status information, LSP status information, and/or Section status information.

In this embodiment, by using the following steps 405 and 406, the second network device may actively request, from the first network device, synchronization information that needs to be synchronized.

Step 405: The second network device sends a synchronization request message to the first network device.

In some embodiments, if the second network device requests all synchronization information included by the first network device, the synchronization request message sent by the second network device to the first network device may not carry an information type of the synchronization information that is requested; if the second network device requests only part of synchronization information of the first network device, the synchronization request message sent by the second network device to the first network device may further carry an information type of the synchronization information that is requested by the second network device.

In some embodiments, the first network device receives the synchronization request message sent by the second network device, determines the synchronization information that is requested by the second network device according to the synchronization request message, sends a fourth synchronization packet to the second network device through the established inband synchronization channel, where the fourth synchronization packet carries the synchronization information that is requested by the second network device. In some embodiments, the first network device receives the synchronization request message sent by the second network device; if the synchronization request message does not carry the information type of the synchronization information that is requested by the second network device, the first network device determines that the second network device requests all synchronization information included by the first network device; if the synchronization request message further carries the information type of the synchronization information that is requested by the second network device, the first network device determines that the synchronization information that is requested by the second network device is synchronization information corresponding to the information type and sends the fourth synchronization packet to the second network device through the established inband synchronization channel, where the fourth synchronization packet carries the synchronization information that is requested by the second network device.

Step 406: The second network device receives the fourth synchronization packet through the established inband synchronization channel, and performs synchronization processing according to the synchronization information that is requested by the second network device and carried in the fourth synchronization packet, so as to implement synchronization with the first network device.

In some embodiments, the second network device receives the fourth synchronization packet through the established inband synchronization channel, identifies the fourth synchronization packet as a synchronization packet according to the synchronization packet identification information in the generic associated channel header included in the fourth synchronization packet, and updates the stored synchronization information that is requested by the second network device to the synchronization information that is requested by the second network device and carried in the fourth synchronization packet.

In this embodiment of the present disclosure, a second network device establishes an inband synchronization channel to a first network device in a backup group in an MPLS-TP network, and receives, through the established inband synchronization channel, a first synchronization packet sent by the first network device, where the first synchronization packet carries synchronization information of the first network device, and synchronizes with the first network device according to the synchronization information of the first network device carried in the first synchronization packet; the second network device sends a second synchronization packet to the first network device through the established inband synchronization channel, where the second synchronization packet carries synchronization information of the second network device; the first network device receives the second synchronization packet through the established inband synchronization channel and synchronizes with the second network device according to the synchronization information of the second network device carried in the second synchronization packet. The foregoing process implements synchronization between the network devices in the MPLS-TP network that does not have a control plane.

It should be further noted that, in some embodiments, step 406 is performed after step 405 is performed. That is, step 405 is a basis of step 406 in some embodiments. However, step 405 may not depend on step 403 or may also not depend on step 404. That is, step 405 may be performed in a situation in which step 403 and/or step 404 is not performed.

Embodiment 5

Figure 5:
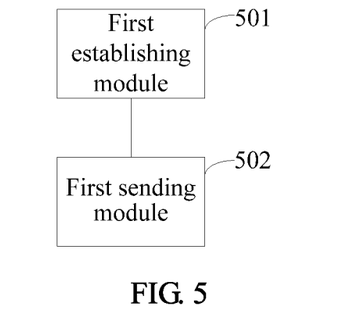
FIG. 5 is a schematic structural diagram of a first network device according to Embodiment 5 of the present disclosure.

As shown in FIG. 5, this embodiment of the present disclosure provides a first network device, including:

a first establishing module 501, configured to establish an inband synchronization channel to a second network device in an MPLS-TP network, where the inband synchronization channel is a channel on a data plane, and the first network device and the second network device are included in a same backup group; and a first sending module 502, configured to send a first synchronization packet to the second network device through the established inband synchronization channel, where the first synchronization packet carries synchronization information of the first network device so that the second network device performs synchronization processing according to the synchronization information of the first network device, and the synchronization information of the first network device includes at least configuration information and/or status information of the first network device.

In some embodiments, the first synchronization packet includes a generic associated channel header, where the generic associated channel header includes a channel type field, the channel type field carries synchronization packet identification information, the synchronization packet identification information is used to identify a packet that carries the synchronization packet identification information as a synchronization packet, and the synchronization packet identification information can be identified by the second network device.

Figure 6:
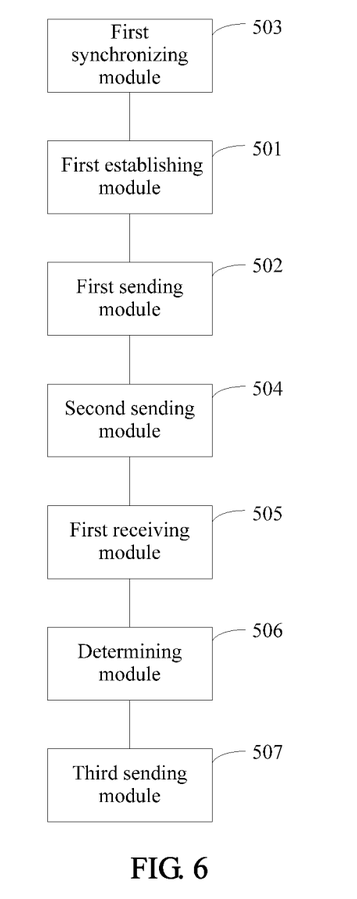
FIG. 6 is a schematic structural diagram of a first network device according to Embodiment 5 of the present disclosure.

In some embodiments, referring to FIG. 6, the first network device further includes:

a first synchronizing module 503, configured to: receive, through the inband synchronization channel, a second synchronization packet sent by the second network device, where the second synchronization packet carries synchronization information of the second network device, and the second synchronization packet includes the generic associated channel header; perform synchronization processing on the first network device according to the synchronization information of the second network device, so as to make the first network device synchronous with the second network device.

In some embodiments, referring to FIG. 6, the first network device further includes:

a second sending module 504, configured to send a third synchronization packet to the second network device through the established inband synchronization channel after the synchronization information of the first network device changes, where the third synchronization packet includes new synchronization information of the first network device and the generic associated channel header so that the second network device synchronizes with the first network device according to the new synchronization information of the first network device.

In some embodiments, referring to FIG. 6, the first network device further includes:

a first receiving module 505, configured to receive a synchronization request message sent by the second network device;

a determining module 506, configured to determine, according to the synchronization request message, synchronization information that is requested by the second network device; and a third sending module 507, configured to send a fourth synchronization packet to the second network device through the established inband synchronization channel, where the fourth synchronization packet carries the synchronization information that is requested by the second network device and the generic associated channel header so that the second network device synchronizes with the first network device according to the synchronization information that is requested by the second network device.

Optionally, the synchronization request message is used to request, for the second network device, all synchronization information of the first network device when the synchronization request message is received;

or the synchronization request message is used to request, for the second network device, part of synchronization information of the first network device when the synchronization request message is received, where the part of synchronization information belongs to a same information type.

Optionally, the established inband synchronization channel is a G-ACH channel.

In this embodiment of the present disclosure, a first network device establishes an inband synchronization channel to a second network device in an MPLS-TP network and sends a first synchronization packet to the second network device through the established inband synchronization channel, where the first synchronization packet carries synchronization information of the first network device so that the second network device synchronizes with the first network device according to the synchronization information of the first network device to implement synchronization between the network devices in the MPLS-TP network that does not have a control plane.

Embodiment 6

Figure 7:
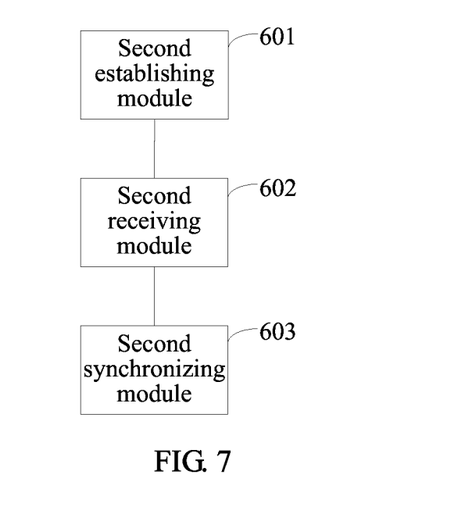
FIG. 7 is a schematic structural diagram of a second network device according to Embodiment 6 of the present disclosure.

As shown in FIG. 7, this embodiment of the present disclosure provides a second network device, including:

a second establishing module 601, configured to establish an inband synchronization channel to a first network device in an MPLS-TP network, where the inband synchronization channel is a channel on a data plane, and the first network device and the second network device are included in a same backup group;

a second receiving module 602, configured to receive, through the established inband synchronization channel, a first synchronization packet sent by the first network device, where the first synchronization packet carries synchronization information of the first network device, and the synchronization information of the first network device includes configuration information and/or status information of the first network device; and a second synchronizing module 603, configured to perform synchronization processing according to the synchronization information of the first network device, so as to implement synchronization with the first network device.

Optionally, the first synchronization packet includes a generic associated channel header, where the generic associated channel header includes a channel type field, the channel type field carries synchronization packet identification information, the synchronization packet identification information is used to identify a packet that carries the synchronization packet identification information as a synchronization packet, and the synchronization packet identification information can be identified by the second network device.

Figure 8:
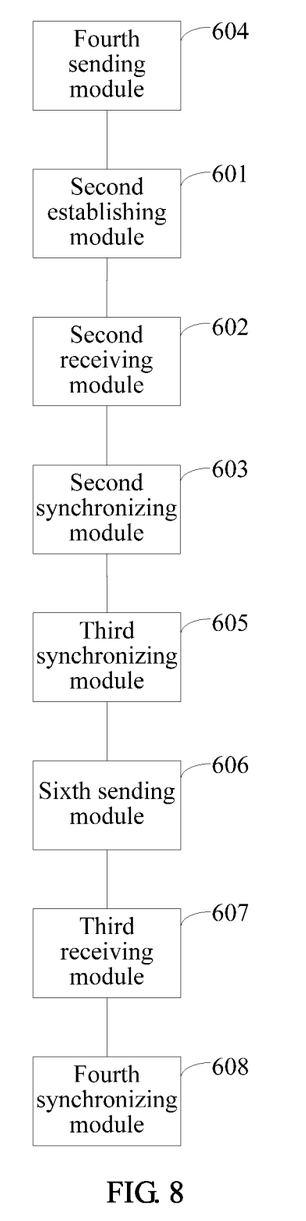
FIG. 8 is a schematic structural diagram of a second network device according to Embodiment 6 of the present disclosure.

In some embodiments, referring to FIG. 8, the second network device further includes:

a fourth sending module 604, configured to send a second synchronization packet to the first network device through the established inband synchronization channel, where the second synchronization packet carries synchronization information of the second network device and the generic associated channel header so that the first network device performs synchronization processing according to the synchronization information of the second network device.

In some embodiments, referring to FIG. 8, the second network device further includes:

a third synchronizing module 605, configured to: receive, through the inband synchronization channel after the synchronization information of the first network device changes, a third synchronization packet sent by the first network device, where the third synchronization packet includes new synchronization information of the first network device and the generic associated channel header; synchronize with the first network device according to the new synchronization information of the first network device.

In some embodiments, referring to FIG. 8, the second network device further includes:

a sixth sending module 606, configured to send a synchronization request message to the first network device, so that the first network device determines, according to the synchronization request message, synchronization information that is requested by the second network device;

a third receiving module 607, configured to receive, through the established inband synchronization channel, a fourth synchronization packet sent by the first network device, where the fourth synchronization packet carries the synchronization information that is requested by the second network device and the generic associated channel header; and a fourth synchronizing module 608, configured to synchronize with the first network device according to the synchronization information that is requested by the second network device.

Optionally, the synchronization request message is used to request, for the second network device, all synchronization information of the first network device when the synchronization request message is received;

or the synchronization request message is used to request, for the second network device, part of synchronization information of the first network device when the synchronization request message is received, where the part of synchronization information belongs to a same information type.

Optionally, the inband synchronization channel is a G-ACH channel.

In this embodiment of the present disclosure, a second network device establishes an inband synchronization channel to a first network device in an MPLS-TP network, receives, through the established inband synchronization channel, a first synchronization packet sent by the first network device, where the first synchronization packet carries synchronization information of the first network device, and synchronizes with the first network device according to the synchronization information of the first network device, so as to implement synchronization between the network devices in the MPLS-TP network that does not have a control plane.

Embodiment 7

Figure 9:
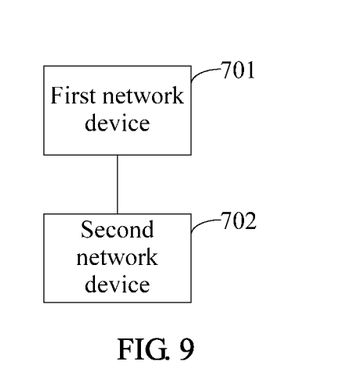
FIG. 9 is a schematic structural diagram of a system for synchronization between network devices according to Embodiment 7 of the present disclosure.

As shown in FIG. 9, this embodiment of the present disclosure provides a system for synchronization between network devices, including the first network device 701 described in Embodiment 5 and the second network device 702 described in Embodiment 6.

A person of ordinary skill in the art may understand that all or a part of the steps of the embodiments may be implemented by hardware or a program instructing relevant hardware. The program may be stored in a computer readable storage medium. The storage medium may include: a read-only memory, a magnetic disc, or an optical disc.

The foregoing descriptions are merely exemplary embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A method for synchronization between network devices, wherein the method comprises:
    establishing, by a first network device, an inband synchronization channel to a second network device in a Multiprotocol Label Switching Transport Profile MPLS-TP network, wherein the inband synchronization channel is a channel on a data plane, and the first network device and the second network device are comprised in a same backup group; and
    sending, by the first network device, a first synchronization packet to the second network device through the inband synchronization channel, wherein the first synchronization packet carries synchronization information of the first network device, so that the second network device performs synchronization processing according to the synchronization information of the first network device, and the synchronization information of the first network device comprises configuration information and/or status information of the first network device;
    wherein the method further comprises performing, after the establishing, by a first network device, an inband synchronization channel to a second network device in an MPLS-TP network:
        receiving, by the first network device, a synchronization request message sent by the second network device;
        determining, by the first network device, according to the synchronization request message, synchronization information that is requested by the second network device; and
        sending, by the first network device, a fourth synchronization packet to the second network device through the inband synchronization channel, wherein the fourth synchronization packet carries the synchronization information that is requested by the second network device and a generic associated channel header so that the second network device synchronizes with the first network device according to the synchronization information that is requested by the second network device.

2. The method according to claim 1, wherein the first synchronization packet comprises a generic associated channel header, the generic associated channel header comprises a channel type field, the channel type field carries synchronization packet identification information, the synchronization packet identification information is used to identify a packet that carries the synchronization packet identification information as a synchronization packet, and the synchronization packet identification information can be identified by the second network device.

3. The method according to claim 1, wherein after the establishing, by a first network device, an inband synchronization channel to a second network device in an MPLS-TP network, the method further comprises:
    receiving, by the first network device through the inband synchronization channel, a second synchronization packet sent by the second network device, wherein the second synchronization packet carries synchronization information of the second network device, and the second synchronization packet comprises a generic associated channel header; and
    performing, by the first network device, synchronization processing on the first network device according to the synchronization information of the second network device, so as to make the first network device synchronous with the second network device.

4. The method according to claim 1, wherein after the sending a first synchronization packet to the second network device through the inband synchronization channel, the method further comprises:
    after the synchronization information of the first network device changes, sending, by the first network device, a third synchronization packet to the second network device through the inband synchronization channel, wherein the third synchronization packet comprises new synchronization information of the first network device and a generic associated channel header so that the second network device synchronizes with the first network device according to the new synchronization information of the first network device.

5. The method according to claim 1, wherein:
    the synchronization request message is used to request, for the second network device, all synchronization information of the first network device when the synchronization request message is received;
    or
    the synchronization request message is used to request, for the second network device, part of synchronization information of the first network device when the synchronization request message is received, wherein the part of synchronization information belongs to a same information type.

6. The method according to claim 1, wherein the inband synchronization channel is a generic associated channel G-ACH.

7. A method for synchronization between network devices, wherein the method comprises:
    establishing, by a second network device, an inband synchronization channel to a first network device in a Multiprotocol Label Switching Transport Profile MPLS-TP network, wherein the inband synchronization channel is a channel on a data plane, and the first network device and the second network device are comprised in a same backup group;
    receiving, by the second network device through the inband synchronization channel, a first synchronization packet sent by the first network device, wherein the first synchronization packet carries synchronization information of the first network device, and the synchronization information of the first network device comprises configuration information and/or status information of the first network device; and
    performing, by the second network device, synchronization processing according to the synchronization information of the first network device, so as to implement synchronization with the first network device;

wherein the method further comprises performing, after the establishing, by a second network device, an inband synchronization channel to a second network device in an MPLS-TP network:
- sending, by the second network device, a synchronization request message to the first network device;
- receiving, by the second network device through the inband synchronization channel, a fourth synchronization packet sent by the first network device, wherein the fourth synchronization packet carries the synchronization information that is requested by the second network device and a generic associated channel header;
- performing, by the second network device, synchronization processing according to the synchronization information that is requested by the second network device and carried in the fourth synchronization packet.

8. The method according to claim 7, wherein the first synchronization packet comprises a generic associated channel header, the generic associated channel header comprises a channel type field, the channel type field carries synchronization packet identification information, the synchronization packet identification information is used to identify a packet that carries the synchronization packet identification information as a synchronization packet, and the synchronization packet identification information can be identified by the second network device.

9. A first network device, wherein the first network device comprises:
- a first establishing module, configured to establish an inband synchronization channel to a second network device in a Multiprotocol Label Switching Transport Profile MPLS-TP network, wherein the inband synchronization channel is a channel on a data plane, and the first network device and the second network device are comprised in a same backup group;
- a first sending module, configured to send a first synchronization packet to the second network device through the inband synchronization channel, wherein the first synchronization packet carries synchronization information of the first network device so that the second network device performs synchronization processing according to the synchronization information of the first network device, and the synchronization information of the first network device comprises at least configuration information and/or status information of the first network device;
- a first receiving module, configured to receive a synchronization request message sent by the second network device;
- a determining module, configured to determine, according to the synchronization request message, synchronization information that is requested by the second network device; and
- a third sending module, configured to send a fourth synchronization packet to the second network device through the inband synchronization channel, wherein the fourth synchronization packet carries the synchronization information that is requested by the second network device and a generic associated channel header so that the second network device synchronizes with the first network device according to the synchronization information that is requested by the second network device.

10. The first network device according to claim 9, wherein the first synchronization packet comprises a generic associated channel header, the generic associated channel header comprises a channel type field, the channel type field carries synchronization packet identification information, the synchronization packet identification information is used to identify a packet that carries the synchronization packet identification information as a synchronization packet, and the synchronization packet identification information can be identified by the second network device.

11. The first network device according to claim 9, wherein the first network device further comprises:
- a first synchronizing module, configured to: receive, through the inband synchronization channel, a second synchronization packet sent by the second network device, wherein the second synchronization packet carries synchronization information of the second network device, and the second synchronization packet comprises a generic associated channel header; perform synchronization processing on the first network device according to the synchronization information of the second network device, so as to make the first network device synchronous with the second network device.

12. The first network device according to claim 9, wherein the first network device further comprises:
- a second sending module, configured to send a third synchronization packet to the second network device through the inband synchronization channel after the synchronization information of the first network device changes, wherein the third synchronization packet comprises new synchronization information of the first network device and a generic associated channel header so that the second network device synchronizes with the first network device according to the new synchronization information of the first network device.

13. The first network device according to claim 9, wherein:
the synchronization request message is used to request, for the second network device, all synchronization information of the first network device when the synchronization request message is received;
or
the synchronization request message is used to request, for the second network device, part of synchronization information of the first network device when the synchronization request message is received, wherein the part of synchronization information belongs to a same information type.

14. The first network device according to claim 9, wherein the inband synchronization channel is a generic associated channel G-ACH channel.

* * * * *